(12) United States Patent
Inami et al.

(10) Patent No.: US 12,496,869 B2
(45) Date of Patent: Dec. 16, 2025

(54) VEHICLE-BODY STRUCTURE WITH AIR CONDITIONER

(71) Applicant: Mazda Motor Corporation, Hiroshima (JP)

(72) Inventors: Takuma Inami, Hiroshima (JP); Nobuyuki Nakayama, Hiroshima (JP); Hiroyuki Baba, Hiroshima (JP); Hiroshi Tanaka, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 482 days.

(21) Appl. No.: 17/940,027

(22) Filed: Sep. 8, 2022

(65) Prior Publication Data

US 2023/0100068 A1    Mar. 30, 2023

Related U.S. Application Data

(63) Continuation of application No. 17/938,942, filed on Sep. 7, 2022, now Pat. No. 12,415,575.
(Continued)

(30) Foreign Application Priority Data

| Sep. 30, 2021 | (JP) | 2021-161834 |
| Nov. 10, 2021 | (JP) | 2021-183253 |
| Nov. 10, 2021 | (JP) | 2021-183255 |
| Nov. 10, 2021 | (JP) | 2021-183319 |
| Nov. 10, 2021 | (JP) | 2021-183336 |

(51) Int. Cl.
*B62D 25/20* (2006.01)
*B60H 1/00* (2006.01)
*B60H 1/24* (2006.01)
*B60K 1/00* (2006.01)
*B60K 1/04* (2019.01)
(Continued)

(52) U.S. Cl.
CPC ..... *B62D 25/2045* (2013.01); *B60H 1/00392* (2013.01); *B60H 1/00564* (2013.01); *B60H 1/00571* (2013.01); *B60H 1/246* (2013.01); *B60K 1/04* (2013.01); *B60L 50/60* (2019.02); *B60L 50/66* (2019.02); *B62D 21/11* (2013.01); *B62D 25/20* (2013.01);
(Continued)

(58) Field of Classification Search
CPC ............ B60H 1/00564; B60H 1/246; B60H 2001/002; B60K 11/06
See application file for complete search history.

(56) References Cited

FOREIGN PATENT DOCUMENTS

| DE | 10257123 A1 * | 6/2004 | ............ B60N 2/793 |
| DE | 102020108534 B3 | 7/2021 | |

(Continued)

*Primary Examiner* — Edelmira Bosques
*Assistant Examiner* — Michael James Giordano
(74) *Attorney, Agent, or Firm* — XSENSUS LLP

(57) ABSTRACT

A vehicle-body structure may include a floor panel, a center frame disposed to be higher than and away from the floor panel, and an air-conditioning device. The air-conditioning device may include an air distribution portion that is positioned higher than a front portion of the center frame and distributes generated air-conditioned air to each portion of an occupant space, and under-feet ducts that guide air-conditioned air to a lower side. The under-feet ducts each may extend downward from the upper side of the center frame through a vehicle-width-direction outer side of the center frame.

17 Claims, 13 Drawing Sheets

Related U.S. Application Data

(60) Provisional application No. 63/403,800, filed on Sep. 5, 2022.

(51) Int. Cl.
  *B60L 50/60* (2019.01)
  *B62D 21/11* (2006.01)

(52) U.S. Cl.
  CPC .... *B62D 25/2018* (2013.01); *B60K 2001/006* (2013.01); *B60K 2001/0438* (2013.01)

(56) References Cited

FOREIGN PATENT DOCUMENTS

| | | | |
|---|---|---|---|
| JP | H0732860 A | * | 2/1995 |
| JP | 2000071903 A | * | 3/2000 |
| JP | 2005-41395 A | | 2/2005 |
| JP | 2009-101815 A | | 5/2009 |
| JP | 2019-123461 A | | 7/2019 |
| JP | 2019-177831 A | | 10/2019 |
| JP | 2019-189161 A | | 10/2019 |
| JP | 2021-35789 A | | 3/2021 |
| KR | 20170022390 A | * | 3/2017 |
| WO | 2014/155805 A1 | | 10/2014 |

\* cited by examiner

VEHICLE-BODY STRUCTURE WITH AIR CONDITIONER

CROSS-REFERENCES TO RELATED APPLICATIONS

The present application is a continuation application of U.S. patent application Ser. No. 17/938,942, filed on Sep. 7, 2022, which claims priority to Provisional Ser. No. 63/403,800, filed on Sep. 5, 2022, which claims benefit of Japanese Patent Application 2021-161834, filed Sep. 30, 2021, Japanese Patent Application 2021-183253, filed Nov. 10, 2021, Japanese Patent Application 2021-183319, filed Nov. 10, 2021, Japanese Patent Application 2021-183255, filed Nov. 10, 2021, and Japanese Patent Application 2021-83336, filed Nov. 10, 2021, the entire contents of each of which are incorporated herein by reference.

BACKGROUND

Field

The present disclosure relates to a vehicle-body structure provided in an automobile.

Description of the Related Art

For example, in an automobile disclosed in Patent Literature 1, a control device is arranged inside an instrument panel at a position lower than the upper surface of the instrument panel and higher than an accelerator pedal.

CITATION LIST

Patent Literature

[Patent Literature 1] Japanese Patent Laid-open No. 2021-35789

SUMMARY

Problems to be Solved by the Disclosure

It is an important problem of an automobile how to ensure vehicle body stiffness. As for this problem, for example, a reinforcement member or the like can be provided in a vehicle cabin, but other components, device, and the like are disposed in the vehicle cabin, and it has been difficult to increase vehicle body stiffness while improving flexibility of layout of these members.

The present disclosure has been made in view of the above-described problem and has an objective to improve flexibility of layout in a vehicle cabin while increasing vehicle body stiffness.

Means for Solving the Problems

To achieve the above-described objective, a vehicle-body structure of an automobile may be premised in a first aspect of the present disclosure. The vehicle-body structure may include a floor panel constituting a floor of an occupant space including a seat on which a passenger sits, a center frame disposed to be higher than and away from the floor panel at a vehicle-width-direction central portion of the occupant space and extending in a vehicle front-rear direction, and an air-conditioning device for sending air-conditioned air to the occupant space. The air-conditioning device may include an air distribution portion that is positioned higher than a front portion of the center frame and distributes generated air-conditioned air to each portion of the occupant space, and an under-feet duct that guides, to a lower side, air-conditioned air sent from the air distribution portion. The under-feet duct may extend downward from an upper side of the center frame through a vehicle-width-direction outer side of the center frame.

With this configuration, a vehicle-body reinforcement effect can be obtained since the center frame higher than and away from the floor panel is provided in the occupant space, and as a result, vehicle body stiffness can be increased. Moreover, since the air distribution portion of the air-conditioning device is positioned higher than the center frame, the air distribution portion does not need to be arranged in a space below the center frame. In addition, since the under-feet duct connected to the air distribution portion extends downward through the vehicle-width-direction outer side of the center frame, the under-feet duct does not need to be arranged in the space below the center frame. Thus, various components, devices, and the like can be arranged in the space below the center frame, which improves flexibility of layout.

In a second aspect of the present disclosure, the front portion of the center frame may be constituted by a left-side frame member and a right-side frame member that are provided at an interval in a vehicle width direction. The under-feet duct may include a left-side under-feet duct extending downward from an upper side of the left-side frame member through a vehicle-width-direction outer side of the left-side frame member, and a right-side under-feet duct extending downward from an upper side of the right-side frame member through a vehicle-width-direction outer side of the right-side frame member.

With this configuration, air-conditioned air can be sent to the left and right sides in the occupant space through the left-side under-feet duct and the right-side under-feet duct, respectively, and accordingly, passenger comfort can be improved. In this case, the left-side under-feet duct and the right-side under-feet duct do not need to be arranged in the space below the center frame, and thus flexibility of layout in the space below the center frame does not degrade.

The center frame according to a third aspect of the present disclosure may have a hollow shape. An air introducing duct that provides communication between the air distribution portion of the air-conditioning device and inside of the center frame and introduces, into the inside of the center frame, air-conditioned air vented out of the air distribution portion is disposed between the left-side frame member and the right-side frame member. An air-sending portion for sending air-conditioned air in the center frame is provided at a part separated on a vehicle rear side from a connection part of the center frame to the air introducing duct.

With this configuration, air-conditioned air generated by the air-conditioning device is introduced into the center frame through the air introducing duct and then vented out of the air-sending portion. Since the center frame extends in the front-rear direction, the air-conditioned air can be guided to a desired place in the front-rear direction in the occupant space. In this case, since the air introducing duct is disposed between the left-side frame member and the right-side frame member, the air introducing duct does not need to be arranged in the space below the center frame, and thus flexibility of layout in the space below the center frame does not degrade.

A control device that controls a control target unit mounted on the automobile may be disposed at a lower position than the center frame according to a fourth aspect of the present disclosure.

With this configuration, the space below the center frame can be effectively utilized as a layout space for the control device. Moreover, although the control device is heat-sensitive in some cases, direct sunlight from the outside is interrupted by the center frame since the center frame is positioned higher than the control device in the present configuration, and accordingly, temperature increase of the control device is suppressed.

In a fifth aspect of the present disclosure, a dimension of a section of the under-feet duct in the vehicle front-rear direction may be set to be longer than a dimension of the section in a vehicle width direction, the section being orthogonal to an air circulation direction.

With this configuration, since the section of the under-feet duct has a flat shape that is long in the vehicle front-rear direction, the cross-sectional area can be enlarged to have a large air-sending volume while expansion of the under-feet duct in the vehicle width direction is suppressed.

Advantageous Effects of Disclosure

As described above, a center frame is disposed to be higher than and away from a floor panel, an air distribution portion of an air-conditioning device is provided above the center frame, and a duct that guides air-conditioned air to the lower side is provided extending downward from the upper side of the center frame through a vehicle-width-direction outer side of the center frame, and accordingly, the center frame can improve flexibility of layout in a vehicle cabin while increasing vehicle body stiffness.

BRIEF DESCRIPTION OF DRAWINGS

The scope of the present disclosure is best understood from the following detailed description of exemplary embodiments when read in conjunction with the accompanying drawings.

DETAILED DESCRIPTION

Some embodiments of the present disclosure will be described below in detail with reference to the accompanying drawings. The following description of the preferable embodiment is merely exemplary in essence and not intended to limit the present disclosure, its application, nor its usage.

Figure 1:
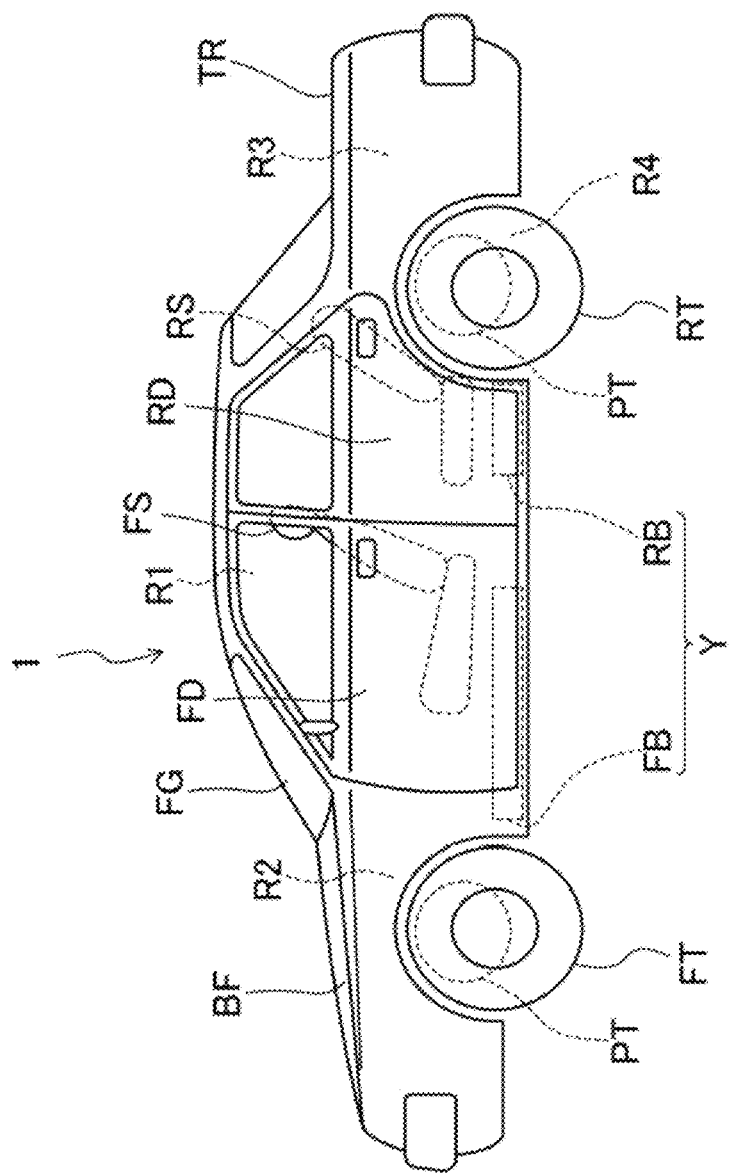
FIG. 1 is a side view of an automobile having a vehicle-body structure according to an embodiment of the present disclosure.

FIG. 1 is a side view of an automobile 1 including a vehicle-body structure A according to the embodiment of the present disclosure when viewed from left. In description of the embodiment, a vehicle front-rear direction is simply referred to as a "front-rear direction", a vehicle front side is simply referred to as a "front side", and a vehicle "rear side" is simply referred to as a "rear side". In addition, a vehicle width direction is the right-left direction of the vehicle, a vehicle left side is simply referred to as a "left side", and a vehicle right side is simply referred to as a "right side".

(Entire Structure of Automobile)

The automobile 1 is a passenger automobile, and an occupant space R1 in which a passenger boards is provided at a front-rear direction intermediate portion of the automobile 1. The occupant space R1 includes front seats (front-row seats) FS included in a front row, and rear seats (rear-row seats) RS included in a rear row. The front seats FS include a driver seat arranged on the right side (or the left side) in the occupant space R1, and a front passenger seat arranged on the left side (or the right side) in the occupant space R1. The rear seats RS are arranged on the right and left sides, respectively, in the occupant space R1. Third-row seats may be arranged on the rear side of the rear seats RS. The rear seats RS are not essential and may be omitted.

A front door FD and a rear door RD are disposed on each of the left and right sides of the occupant space R1. The rear door RD may be omitted in a case of the automobile 1 including no rear seats RS.

A front-side space R2 is provided on the front side of the occupant space R1 in the automobile 1. A powertrain PT can be mounted in the front-side space R2 as necessary. When the powertrain PT is mounted in the front-side space R2, the front-side space R2 may be called, for example, a powertrain storage room, a motor room, or an engine room. A bonnet hood BF is provided at an upper portion of the front-side space R2.

A trunk space R3 in which a package or the like can be housed is provided on the rear side of the occupant space R1 in the automobile 1. The trunk space R3 can be opened and closed by a trunk lid TR. A rear-side space R4 is provided on the rear side of the occupant space R1 and at a position lower than the trunk space R3 in the automobile 1. The powertrain PT that generates power for the automobile 1 can be mounted in the rear-side space R4 as necessary. When the powertrain PT is mounted in the rear-side space R4, the rear-side space R4 may be called, for example, a powertrain storage room, a motor room, or an engine room.

The powertrain PT may be mounted in each of the front-side space R2 and the rear-side space R4 or the powertrain PT may be mounted in one of them. A front-wheel-drive vehicle in which only front wheels FT are driven by the powertrain PT is achieved when the powertrain PT is mounted only in the front-side space R2, or a rear-wheel-drive vehicle in which only rear wheels RT are driven by the powertrain PT is achieved when the powertrain PT is mounted only in the rear-side space R4. Alternatively, a four-wheel-drive vehicle is achieved when the front wheels FT and the rear wheels RT are driven by the powertrains PT mounted in both the front-side space R2 and the rear-side space R4.

Each powertrain PT includes at least a traveling motor M (illustrated in FIG. 2) for driving a drive wheel and also includes a speed reducer, a transmission, or the like as necessary. Thus, the automobile 1 is an electric vehicle. The traveling motor M is disposed such that the rotation center thereof extends in the right-left direction. The powertrain PT may include, for example, a controller in addition to the traveling motor M. The powertrain PT may include an internal combustion engine. A battery unit Y (also illustrated in FIG. 1) for supplying electric power to the traveling motor M is mounted at a lower portion of the automobile 1. For example, the battery unit Y may be charged by using power generated by the internal combustion engine, and either the front wheels FT or the rear wheels RT or both may be driven by power generated by the internal combustion engine.

The type of the automobile 1 does not necessarily need to be a four-door vehicle as exemplarily illustrated in FIG. 1 and may be, for example, an automobile including no rear doors RD. The present disclosure is also applicable to an automobile, such as a hatchback vehicle, in which the rear-side space R4 can be opened and closed by a tail gate.

Figure 2:
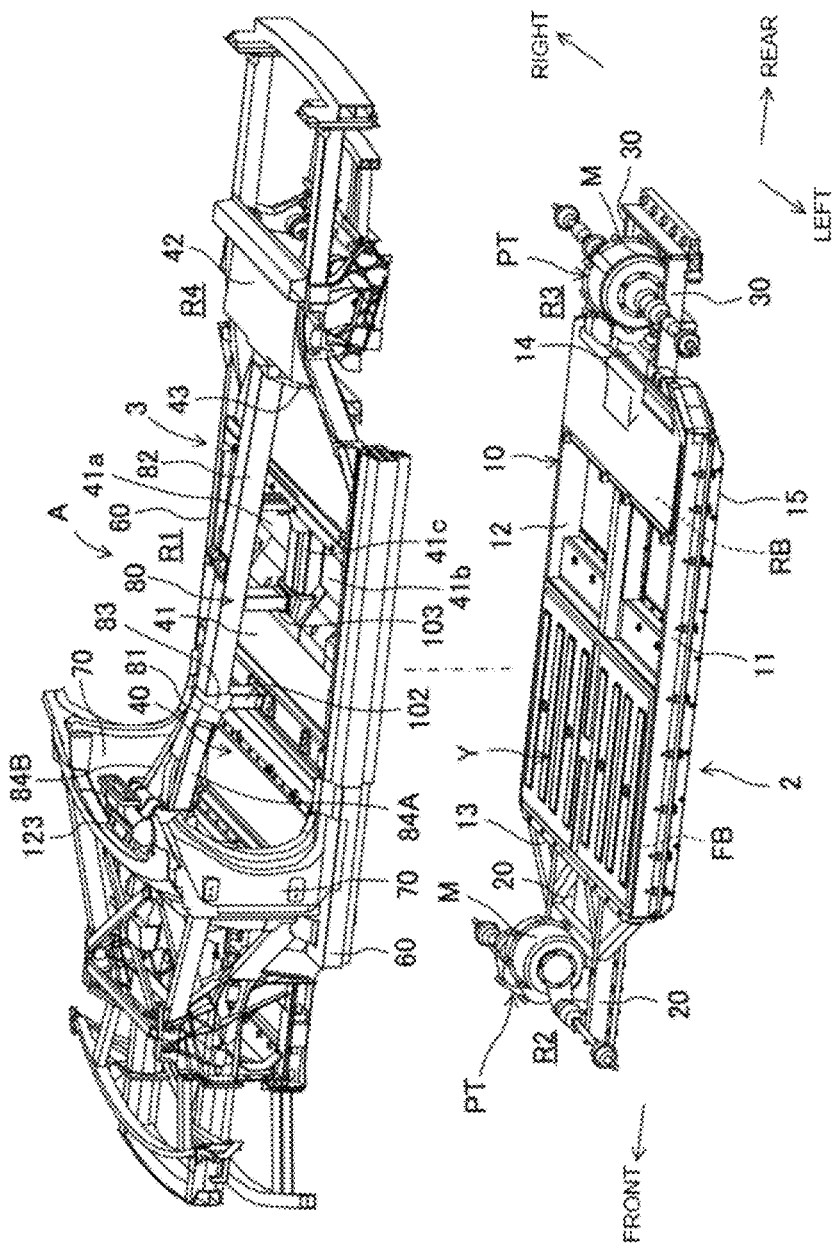
FIG. 2 is a perspective view illustrating a state in which the automobile is divided into an upper-portion structural body and a lower-portion structural body according to an embodiment of the present disclosure.

As illustrated in FIG. 2, the automobile 1 includes a lower-portion structural body 2 and an upper-portion structural body 3, and the vehicle-body structure A is constituted by the lower-portion structural body 2 and the upper-portion structural body 3. FIG. 2 illustrates a state in which the doors FD and RD, the bonnet hood BF, a fender, window glasses, a roof, a center pillar, a rear pillar, a bumper, front and rear lighting devices, an instrument panel, the front and rear seats, and the like, which are included in the upper-portion structural body 3 in reality, are removed. FIG. 2 also illustrates a state in which the front wheels FT, the rear wheels RT, a suspension device, and the like, which are included in the lower-portion structural body 2 in reality, are removed.

The lower-portion structural body 2 includes the battery unit Y. The battery unit Y includes a front-side battery FB, a rear-side battery RB, and a rack frame 10 surrounding the front-side battery FB and the rear-side battery RB. The lower-portion structural body 2 also includes a front support frame 20 extending from a front portion of the rack frame 10 toward the front side, and a rear support frame 30 extending from a rear portion of the rack frame 10 toward the rear side.

In a typical electric automobile, a battery unit is often detachably attached as a separated body from a vehicle body under a floor, but in the present embodiment, not only the batteries FB and RB but also the front support frame 20 and the rear support frame 30 are integrated with the rack frame 10 surrounding the batteries FB and RB, and the front support frame 20 and the rear support frame 30 are detachably attached to the upper-portion structural body 3 together with the batteries FB and RB.

Specifically, the automobile 1 of the present embodiment is configured to be able to be divided in the up-down direction into the lower-portion structural body 2 including the batteries FB and RB, and the upper-portion structural body 3 in which the occupant space R1 and the trunk space R3 are formed. Being able to be divided in the up-down direction means integration of the lower-portion structural body 2 with the upper-portion structural body 3 by using fastening members such as bolts and nuts, screws, and the like without using welding, bonding, and the like. Accordingly, the lower-portion structural body 2 can be separated from the upper-portion structural body 3 as necessary when maintenance and repair are performed after the automobile 1 is handed over to a user, and thus maintainability is excellent.

A vehicle-body structure of a ladder frame type is known as the vehicle-body structure of an automobile. In a case of the vehicle-body structure of the ladder frame type, division into a ladder frame and a cabin in the up-down direction is possible, but the ladder frame continuously extends in the front-rear direction and thus mainly receives a collision load at front collision and rear collision. At side collision, the ladder frame only supplementarily receives a collision load, and the collision load is mainly received by the cabin. In this manner, in the vehicle-body structure of the ladder frame type, it is normal that a member that receives a collision load is different between front or rear collision and side collision.

However, in a case of the automobile 1 of the present embodiment, the lower-portion structural body 2, which includes the front support frame 20 and the rear support frame 30, and the upper-portion structural body 3 can be divided from each other, but its technical idea is largely different from that of the conventional vehicle-body structure of the ladder frame type in that a collision load is received by the lower-portion structural body 2 and the upper-portion structural body 3 in both cases of front or rear collision and side collision and thus the collision load can be dispersed to and absorbed by the structural bodies 2 and 3. Hereinafter, the structures of the lower-portion structural body 2 and the upper-portion structural body 3 will be sequentially described.

(Lower-Portion Structural Body)

First, the lower-portion structural body 2 will be described below. The lower-portion structural body 2 includes the powertrain PT, the front wheels FT, and the rear wheels RT in addition to the batteries FB and RB, the rack frame 10, the front support frame 20, and the rear support frame 30.

As illustrated in FIG. 2, the rack frame 10 is a member for surrounding and protecting the front-side battery FB, the rear-side battery RB, and the like. The rack frame 10 is formed in such a large size that, on the lower side of an occupant-space-side floor panel 41 to be described later, the rack frame 10 extends from the vicinity of a left end portion of the occupant-space-side floor panel 41 to the vicinity of a right end portion thereof and extends from the vicinity of a front end portion of the occupant-space-side floor panel 41 to the vicinity of a rear end portion thereof. The batteries FB and RB may be, for example, lithium-ion batteries or all-solid-state batteries or may be any other secondary batteries. Alternatively, the batteries FB and RB may be what is called battery cells or may be battery packs in which a plurality of battery cells are housed.

The rack frame 10 includes a left-side member 11, a right-side member 12, a front-side member 13, and a rear-side member 14. The left-side member 11, the right-side member 12, the front-side member 13, and the rear-side member 14 are formed of, for example, an extruded material made of an aluminum alloy, but may be formed of a press-formed material such as an aluminum alloy plate material or a steel plate. In description below, an "extruded material" is an extruded material made of an aluminum alloy, and a "press-formed material" is a press-formed material such as an aluminum alloy plate material or a steel plate. Alternatively, each member may be formed of, for example, cast metal or die cast.

When the lower-portion structural body 2 is to be connected to the upper-portion structural body 3, the front-side member 13 is fastened and fixed to a lower portion of a dash panel 50 by a fastening member, and the left-side member 11 and the right-side member 12 are fastened and fixed to right and left side sills 60, respectively, by fastening members. The rear-side member 14 is fastened and fixed to a connection panel 43, which will be described later, by a fastening member. A cover member 15 is attached to a lower portion of the rack frame 10. Note that electric power of the batteries FB and RB housed in the rack frame 10 is supplied to the traveling motor M through a non-illustrated traveling control circuit. The batteries FB and RB can be charged through a non-illustrated charging socket.

As illustrated in FIG. 2, a pair of right and left front support frames 20 are provided and connected to the front-side member 13 of the rack frame 10. The front-side powertrain PT is attached to each front support frame 20 through a non-illustrated mounting member.

Similarly to the front support frames 20, a pair of right and left rear support frames 30 are provided and connected to the rear-side member 14 of the rack frame 10. The rear-side powertrain PT is attached to each rear support frame 30 through a non-illustrated mounting member.

(Upper-Portion Structural Body)

Subsequently, the upper-portion structural body 3 will be described below. The upper-portion structural body 3 includes a floor member 40, the dash panel 50, and the pair of right and left side sills 60. The floor member 40 is a member arranged at a higher position than the rack frame 10 and the rear support frames 30 of the lower-portion structural body 2. The floor member 40 includes the occupant-space-side floor panel 41 constituting a floor of the occupant space R1 including the front seats FS and the rear seats RS (illustrated in FIG. 1) on which passengers sits, a trunk-space-side floor panel 42 constituting a floor of the trunk space R3, and the connection panel 43 connecting a rear portion of the occupant-space-side floor panel 41 and a front portion of the trunk-space-side floor panel 42.

The floor member 40 may be formed of, for example, a member shaped by pressing a steel plate or the like. The occupant-space-side floor panel 41, the trunk-space-side floor panel 42, and the connection panel 43 may be integrally formed or may be separately formed and then connected. In the present embodiment, description is made with the three divided portions of the occupant-space-side floor panel 41, the trunk-space-side floor panel 42, and the connection panel 43, but the floor member 40 including the panels 41 to 43 may be referred to as a floor panel. Alternatively, only the occupant-space-side floor panel 41 may be referred to as a floor panel.

The occupant-space-side floor panel 41 extends from a front portion of the occupant space R1 to a rear portion thereof and from a left-side portion of the occupant space R1 to a right-side portion thereof. The occupant-space-side floor panel 41 according to the present embodiment has a floor tunnel-less structure including no tunnel portion. Specifically, a floor panel of a conventional automobile is typically provided with a tunnel portion largely bulging upward and extending in the front-rear direction. The tunnel portion is a portion for allowing, for example, insertion of an exhaust pipe extending toward a rear side from an engine mounted in an engine room at a vehicle front portion and insertion of a propeller shaft through which output from the engine is transferred to rear wheels. The diameters of the exhaust pipe and the propeller shaft are often, for example, equal to or larger than 10 cm, and furthermore, a gap of at least several centimeters or larger needs to be provided between each of the exhaust pipe and the propeller shaft and the floor panel to prevent interference of the exhaust pipe or the propeller shaft with the floor panel. In addition, for example, an insulator is disposed on an inner surface of the tunnel portion in some cases. With these factors, the height of the tunnel portion from the floor panel is, for example, equal to or larger than 15 cm or equal to or larger than 20 cm in some cases, and as for a positional relation with a seat, an upper end of the tunnel portion is higher than a lower end of a seat cushion on a seat rail or an up-down direction central portion of the seat cushion. A structure without such a tunnel portion largely bulging upward is a tunnel-less structure.

The occupant-space-side floor panel 41 includes no tunnel portion having a height equal to or larger than 15 cm or equal to or larger than 20 cm from an upper surface of the occupant-space-side floor panel 41 as described above, but may include, for example, a bulging portion having a low height equal to or smaller than 5 cm or equal to or smaller than 10 cm from the upper surface of the occupant-space-side floor panel 41. In a case of such a bulging portion having a low height, neither exhaust pipe nor a propeller shaft can be inserted inside the bulging portion, and thus the bulging portion does not function as a tunnel portion. Thus, the occupant-space-side floor panel 41, which includes a bulging portion having a low height equal to or smaller than 5 cm or equal to or smaller than 10 cm from the upper surface of the occupant-space-side floor panel 41, is a floor panel of a tunnel-less structure.

In the present embodiment, since each powertrain PT includes the traveling motor M, no internal combustion engine needs to be mounted in the front-side space R2 and thus no exhaust pipe needs to be guided to the vehicle rear side. When a powertrain PT is mounted in the rear-side space R4, the rear wheels RT can be driven by the powertrain PT and a propeller shaft can be omitted. Accordingly, the occupant-space-side floor panel 41 can have a tunnel-less structure.

Figure 3:
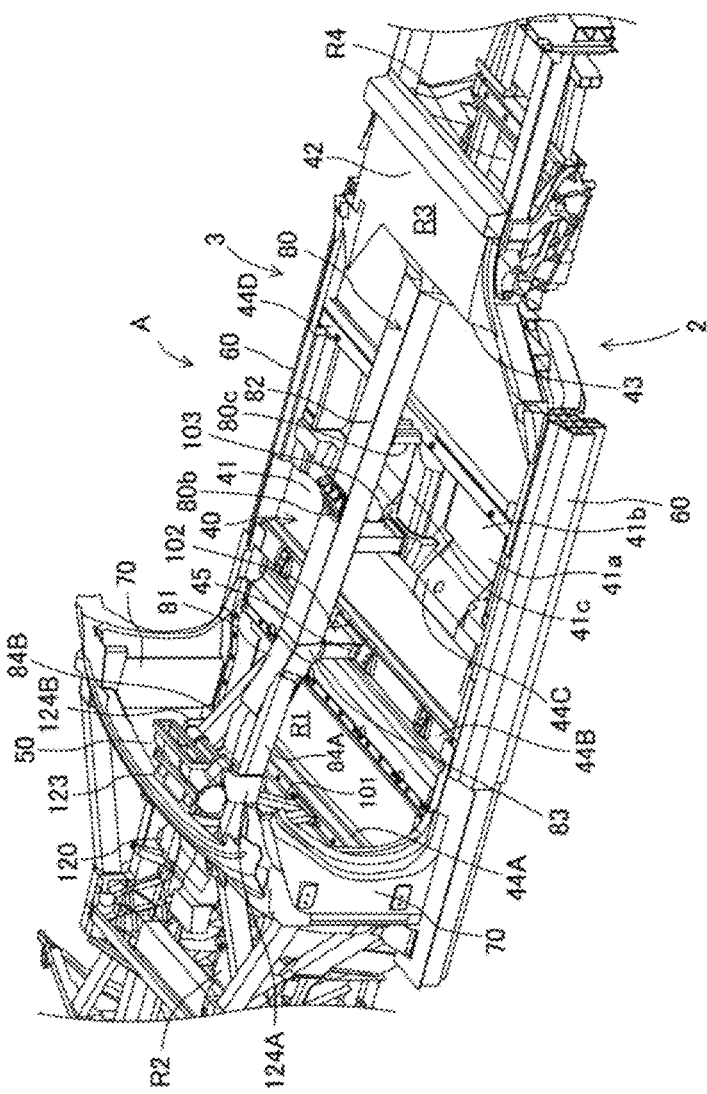
FIG. 3 is a perspective view in which part of the vehicle-body structure is viewed from an upper side according to an embodiment of the present disclosure.

As illustrated in FIG. 3 as well, a recessed portion 41*a* formed bulging downward is formed at a front-rear direction intermediate portion of the occupant-space-side floor panel 41. The recessed portion 41*a* has a bottom surface 41*b* on which the feet of a rear-seat passenger sitting on a rear seat RS can be placed. The bottom surface 41*b* is substantially horizontally formed. A front-side part of the recessed portion 41*a* is formed to be gradually deeper toward the rear side. The recessed portion 41*a* may be continuously formed from a left side portion of the occupant-space-side floor panel 41 to a right side portion thereof. The bottom surface 41*b* has a height substantially same as that of a lower portion of the corresponding side sill 60 to be described later, and accordingly, the height of the bottom surface 41*b* is sufficiently low. The positional relation between the recessed portion 41*a* and a seat cushion of each rear seat RS in the front-rear direction is set such that the feet of a rear-seat passenger sitting on the rear seat RS are naturally placed on the bottom surface 41*b* when the feet are held directly downward. The position of a front portion of the recessed portion 41a is set such that the feet of a rear-seat passenger sitting on the rear seat RS are placed on the bottom surface 41b when the feet are moved obliquely forward. In other words, the position of the recessed portion 41a and the dimension thereof in the front-rear direction are set such that the feet of a rear-seat passenger can be placed on the bottom surface 41b even when the feet are moved somehow in the front-rear direction. Accordingly, a foot space for a rear-seat passenger can be expanded, which improves comfortability. A floor frame 41c extending in the front-rear direction is provided at a right-left direction central portion of the recessed portion 41a. A part at which the recessed portion 41a can be formed is reinforced since the floor frame 41c is provided.

The trunk-space-side floor panel 42 is positioned higher than the occupant-space-side floor panel 41. The rear-side space R4 is positioned lower than the trunk-space-side floor panel 42. Since the trunk-space-side floor panel 42 is arranged at a higher position than the occupant-space-side floor panel 41, the connection panel 43 extends in the up-down direction.

Figure 4:
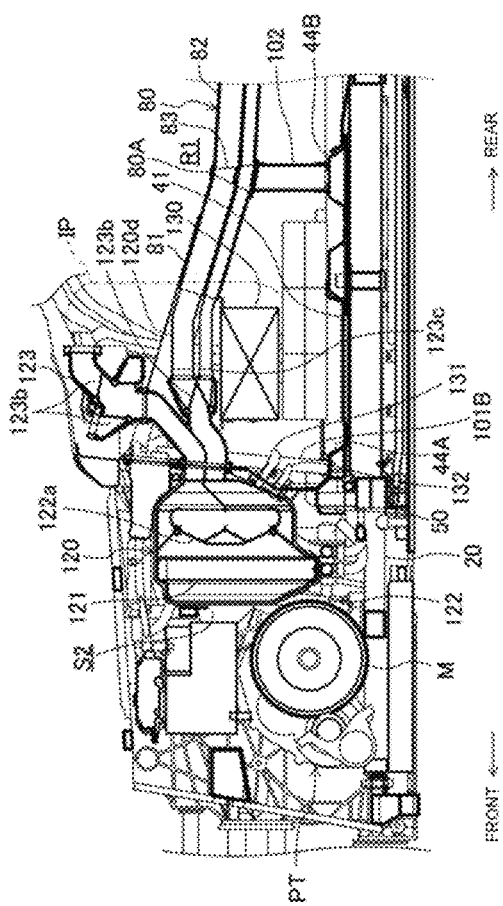
FIG. 4 is a longitudinal cross-sectional view of a vehicle-width-direction central portion, illustrating the vehicle-body structure at an air-conditioning device and the vicinity thereof according to an embodiment of the present disclosure.

As illustrated in FIG. 4 as well, the dash panel 50 is a member as a partition wall between the front-side space R2 and the occupant space R1 and extends upward from a front portion of the occupant-space-side floor panel 41 and in the right-left direction as well, thereby partitioning the front portion of the occupant space R1. FIG. 4 is a cross-sectional view taken along a plane extending in the front-rear direction through a width-direction central portion of the vehicle body.

As illustrated in FIGS. 2 and 3, the right and left side sills 60 are disposed extending in the front-rear direction at right and left end portions, respectively, of the occupant-space-side floor panel 41. A left end portion of the occupant-space-side floor panel 41 is connected to an up-down direction intermediate portion of the left side sill 60. Since the battery unit Y including the batteries FB and RB is disposed at a lower position than the occupant-space-side floor panel 41, such arrangement is made that the lower part of the side sill 60 overlaps with the batteries FB and RB in a vehicle side view. Similarly, the right side sill 60 is connected to the right end portion of the occupant-space-side floor panel 41.

The upper-portion structural body 3 includes a pair of right and left hinge pillars 70. The right and left front doors FD (illustrated in FIG. 1) are rotatably attached to the right and left hinge pillars 70, respectively. A left edge portion of the dash panel 50 is connected to a right-side surface of the left hinge pillar 70. A right edge portion of the dash panel 50 is connected to a left-side surface of the right hinge pillar 70. Note that the upper-portion structural body 3 is also provided with a center pillar, a rear pillar, and the like.

As illustrated in FIGS. 2 and 3, the occupant-space-side floor panel 41 includes a front-portion cross member 44A, an intermediate cross member 44B, a recessed-portion front-side cross member 44C, and a recessed-portion rear-side cross member 44D. The front-portion cross member 44A, the intermediate cross member 44B, the recessed-portion front-side cross member 44C, and the recessed-portion rear-side cross member 44D extend in the right-left direction and are fixed to the upper surface of the occupant-space-side floor panel 41.

As illustrated in FIG. 4, the front-portion cross member 44A is disposed at the front portion of the occupant-space-side floor panel 41. A front portion of the front-portion cross member 44A is also joined to the lower portion of the dash panel 50. The intermediate cross member 44B is disposed on the rear side of the front-portion cross member 44A and on the front side of the recessed portion 41a, and a closed cross-section is constituted by the intermediate cross member 44 and the occupant-space-side floor panel 41.

As illustrated in FIG. 3, the recessed-portion front-side cross member 44C is disposed extending in the right-left direction along the front portion of the recessed portion 41a on the rear side of the intermediate cross member 44B. The recessed-portion rear-side cross member 44D is disposed extending in the right-left direction along a rear portion of the recessed portion 41a on the rear side of the recessed-portion front-side cross member 44C. A front portion of the floor frame 41c provided inside the recessed portion 41a is connected to a right-left direction central portion of the recessed-portion front-side cross member 44C, and a rear portion of the floor frame 41c is connected to a right-left direction central portion of the recessed-portion rear-side cross member 44D.

As illustrated in FIGS. 2 and 3, the upper-portion structural body 3 includes the center frame 80 continuously extending in the front-rear direction from the dash panel 50 to the connection panel 43. The center frame 80 is positioned at a right-left direction central portion and disposed to be higher than and away from the occupant-space-side floor panel 41. The left-side front seat FS and a rear seat RS are disposed on the left side of the center frame 80, and the right-side front seat FS and a rear seat RS are disposed on the right side of the center frame 80.

Since the center frame 80 is arranged to be higher than and away from the occupant-space-side floor panel 41, components and the like can be disposed in a space between a lower surface of the center frame 80 and the upper surface of the occupant-space-side floor panel 41. Alternatively, the space between the lower surface of the center frame 80 and the upper surface of the occupant-space-side floor panel 41 can be used as an object housing unit. As illustrated in FIG. 4, the center frame 80 according to the present embodiment includes a bend portion 80A that bends in the up-down direction at a front-rear direction intermediate portion. Since the bend portion 80A is provided in the center frame 80, for example, a rear-side part can be positioned lower than a front-side part, and thus comfortability of rear-seat passengers can be improved. Since the front-side part of the center frame 80 can be positioned higher than the rear-side part, an object or the like can be arranged at a lower position than the front-side part of the center frame 80. The bend portion 80A is formed at a site on the front side of a front-rear direction central portion of the center frame 80.

Specifically, as illustrated in FIG. 3, the center frame 80 includes a front-side frame member 81 extending in the front-rear direction, a rear-side frame member 82 disposed on the vehicle rear side of the front-side frame member 81 and extending toward the rear side, and a connection member 83 connecting a rear portion of the front-side frame member 81 and a front portion of the rear-side frame member 82. The front-side frame member 81 and the rear-side frame member 82 have hollow shapes, in other words, tubular shapes extending in the front-rear direction and may be formed of, for example, an extruded material. The front-side frame member 81 and the rear-side frame member 82 having hollow shapes are lightweight and high-stiffness members. When the center frame 80 is used as an air sending means of air-conditioned air to be described later, a rear portion of the rear-side frame member 82 may be blocked. The rear portion of the rear-side frame member 82 is connected to the connection panel 43.

Figure 5:
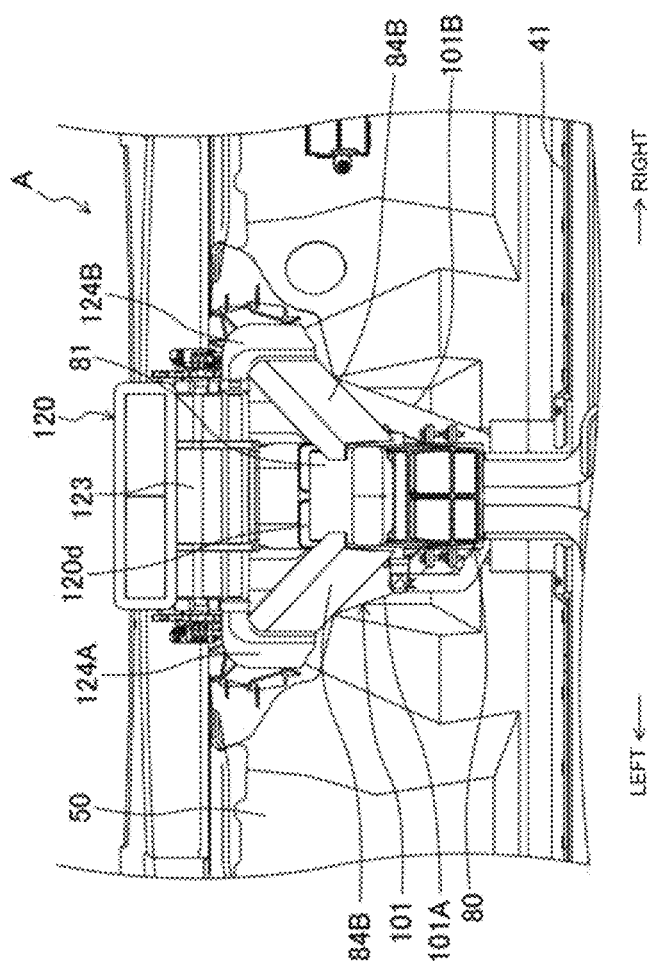
FIG. 5 is a diagram illustrating a sectional shape of a center frame when viewed toward the front side according to an embodiment of the present disclosure.

Vertical cross-sections of the front-side frame member 81 and the rear-side frame member 82 in the vehicle width direction have rectangular shapes, and thus as illustrated in FIG. 5, the front-side frame member 81 and the rear-side frame member 82 each include an upper wall portion and a lower wall portion extending in the right-left direction and right and left sidewall portions extending in the up-down direction. Note that the cross-sectional shapes of the front-side frame member 81 and the rear-side frame member 82 are not limited to rectangular shapes but may be pentagonal shapes or higher polygonal shapes or may be circular shapes or elliptical shapes.

The dimension of the rear-side frame member 82 in the longitudinal direction is set to be longer than the dimension of the front-side frame member 81 in the longitudinal direction. Accordingly, a connection part between the front-side frame member 81 and the rear-side frame member 82 is positioned on the front side of a front-rear direction central portion of the occupant space R1. Note that the center frame 80 is not limited to the two-division structure of the front-side frame member 81 and the rear-side frame member 82 but may be formed as one member a front portion to a rear portion or may have a three-division structure.

As illustrated in FIG. 4 as well, the front-side frame member 81 is tilted at a first tilt angle relative to a horizontal plane and extends straight. The rear-side frame member 82 is tilted at a second tilt angle smaller than the first tilt angle relative to the horizontal plane and extends straight. Since the rear-side frame member 82 is tilted at a tilt angle different from that of the front-side frame member 81, the bend portion 80A that bends downward is formed at the connection part between the front-side frame member 81 and the rear-side frame member 82. In the present embodiment, the rear-side frame member 82 is arranged at a downward tilt toward the rear side. Note that the front-side frame member 81 and the rear-side frame member 82 may have the same tilt angle. In this case, no bend portion 80A is formed.

Figure 6:
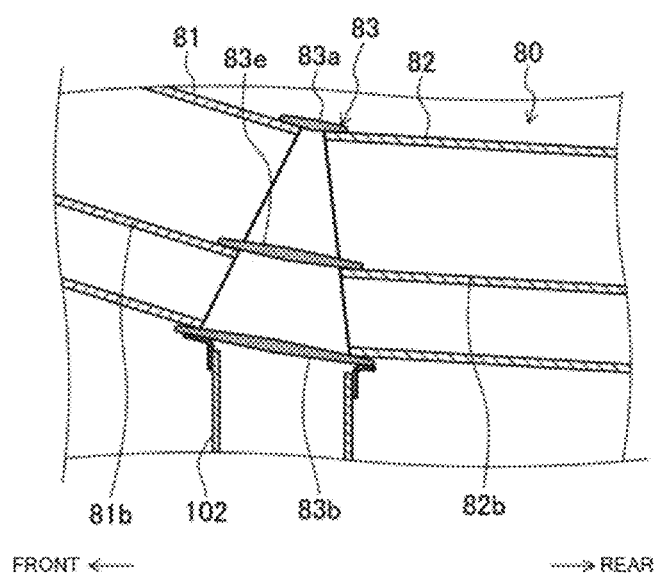
FIG. 6 is a cross-sectional diagram of a bend portion of a center frame and the vicinity thereof according to an embodiment of the present disclosure.
Figure 7:
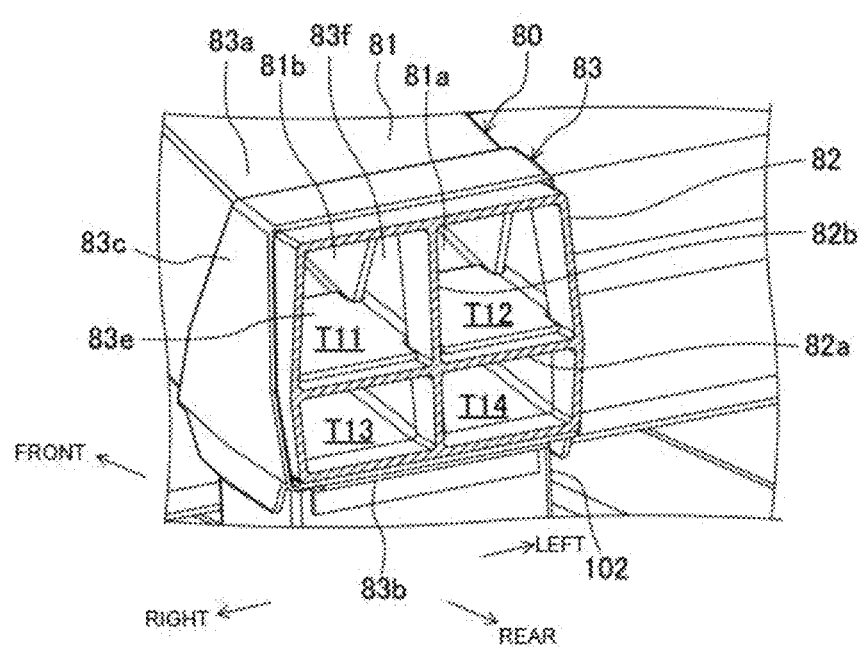
FIG. 7 is a cross-sectional diagram of the vicinity of a front portion of a rear-side frame member constituting the center frame according to an embodiment of the present disclosure.

As illustrated in FIGS. 6 and 7, inside the rear-side frame member 82, a first partition wall portion 82a for partitioning the inner space into an upper path and a lower path is provided extending in the vehicle width direction and the front-rear direction. In addition, inside the rear-side frame member 82, a second partition wall portion 82b for separating a left path on the vehicle-width-direction left side from a right path on the vehicle-width-direction right side is provided extending in the up-down direction and the front-rear direction. The first partition wall portion 82a and the second partition wall portion 82b are integrally formed. Four paths, namely, an upper-left path T11, an upper-right path T12, a lower-left path T13, and a lower-right path T14 are formed inside the rear-side frame member 82 by the first partition wall portion 82a and the second partition wall portion 82b. The first partition wall portion 82a and the second partition wall portion 82b function as ribs provided inside the center frame 80. Note that the first partition wall portion 82a and the second partition wall portion 82b may be provided as necessary, and one or both thereof may be omitted. Three partition wall portions or more may be provided.

Inside the front-side frame member 81, similarly to the inside of the rear-side frame member 82, a first partition wall portion 81a is provided extending in the vehicle width direction and the front-rear direction, and an inner space of the front-side frame member 81 is divided into an upper path and a lower path by the first partition wall portion 81a. In addition, a second partition wall portion 81b that separates a left path on the vehicle-width-direction left side from a right path on the vehicle-width-direction right side is provided inside the front-side frame member 81. Similarly to the rear-side frame member 82, an upper-left path T11, an upper-right path T12, a lower-left path T13, and a lower-right path T14 are formed inside the front-side frame member 81 by the first partition wall portion 81a and the second partition wall portion 81b.

Figure 8:
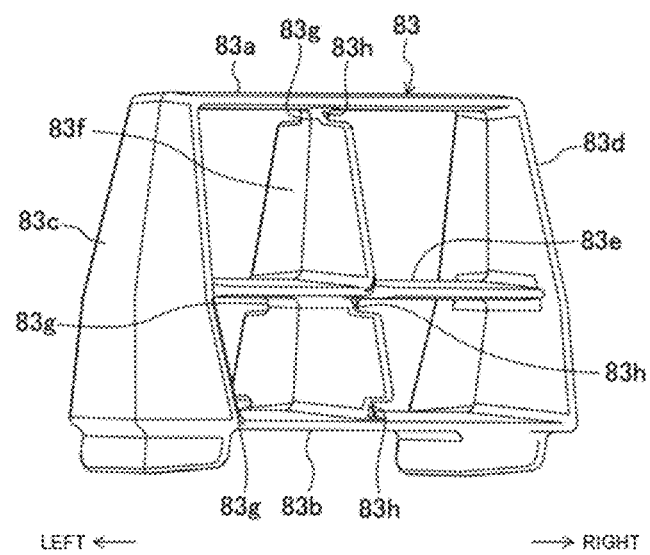
FIG. 8 is a perspective view of a connection member according to an embodiment of the present disclosure.
Figure 9:
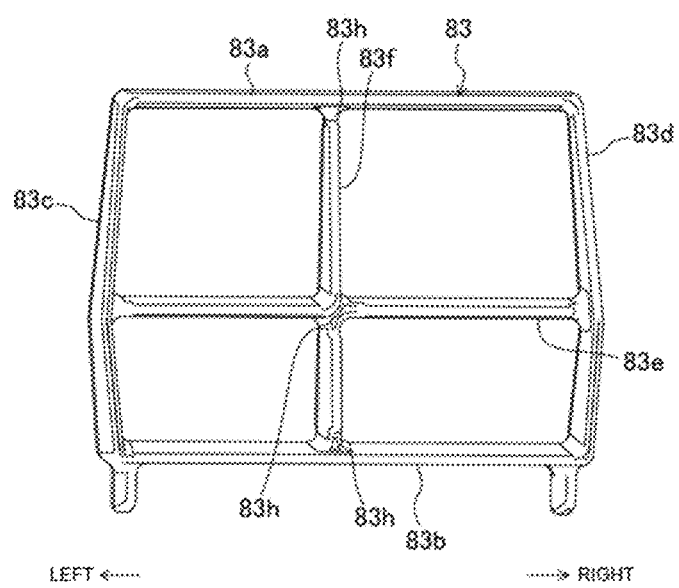
FIG. 9 is a perspective view of the connection member when viewed in another direction according to an embodiment of the present disclosure.
Figure 10:
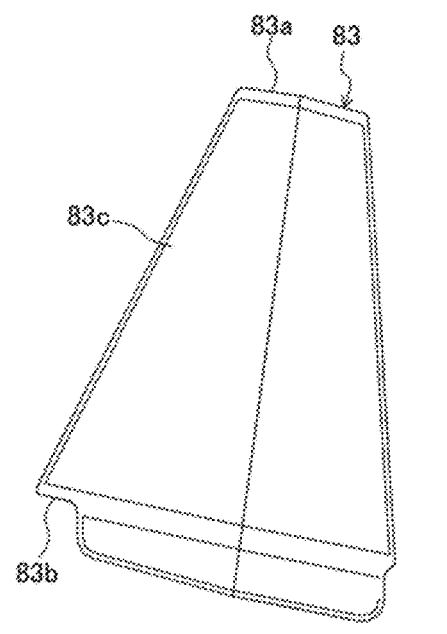
FIG. 10 is a side view of the connection member according to an embodiment of the present disclosure.

As illustrated in FIGS. 8 to 10, the connection member 83 has a tubular shape connecting the rear portion of the front-side frame member 81 and the front portion of the rear-side frame member 82 to allow communication therebetween, and the rear portion of the front-side frame member 81 and the front portion of the rear-side frame member 82 are connected in a state of being inserted in the connection member 83. Specifically, the connection member 83 includes an upper wall portion 83a and a lower wall portion 83b extending in the right-left direction and a left wall portion 8c and a right wall portion 83d extending in the up-down direction. The upper wall portion 83a extends from an upper portion of the left wall portion 8c to an upper portion of the right wall portion 83d, and the lower wall portion 83b extends from a lower portion of the left wall portion 8c to a lower portion of the right wall portion 83d. The dimension of the lower wall portion 83b of the connection member 83 in the front-rear direction is set to be longer than the dimension of the upper wall portion 83a in the front-rear direction. The dimensions of the left wall portion 8c and the right wall portion 83d in the front-rear direction are longer at a lower position in accordance with the difference between the dimensions of the upper wall portion 83a and the lower wall portion 83b in the front-rear direction.

A first connection wall portion 83e extending in the right-left direction from an up-down direction intermediate portion of the left wall portion 8c to an up-down direction intermediate portion of the right wall portion 83d and a second connection wall portion 83f extending from a right-left direction intermediate portion of the upper wall portion 83a to a right-left direction intermediate portion of the lower wall portion 83b are provided inside the connection member 83. The first connection wall portion 83e and the second connection wall portion 83f are integrally formed with the upper wall portion 83a, the lower wall portion 83b, the left wall portion 8c, and the right wall portion 83d.

A front-side cutout portion 83g into which the rear portion of the front-side frame member 81 is inserted is formed on the front side of the second connection wall portion 83f. A rear-side cutout portion 83h into which the front portion of the rear-side frame member 82 is inserted is formed on the rear side of the second connection wall portion 83f. When the front-side frame member 81 and the rear-side frame member 82 are connected to each other through the connection member 83, the upper-left path T11, the upper-right path T12, the lower-left path T13, and the lower-right path T14 of the front-side frame member 81 communicate with the upper-left path T11, the upper-right path T12, the lower-left path T13, and the lower-right path T14, respectively, of the rear-side frame member 82.

As illustrated in FIG. 5, the center frame 80 also includes a left-side frame member 84A and a right-side frame member 84B constituting the front portion of the center frame 80, and accordingly, has a shape bifurcated in the right-left direction. The left-side frame member 84A and the right-side frame member 84B are provided at an interval from each other in the right-left direction. A rear portion of the left-side frame member 84A is fixed to a left-side surface of a front-rear direction intermediate portion of the front-side frame member 81. The left-side frame member 84A is tilted from a fixation part to the front-side frame member 81 toward the front side in a plan view such that the left-side frame member 84A is positioned farther on the left side at a position farther on the front side. A front portion of the left-side frame member 84A is connected to a part of the dash panel 50 higher than and away from the occupant-space-side floor panel 41.

A rear portion of the right-side frame member 84B is fixed to a right-side surface of the front-rear direction intermediate portion of the front-side frame member 81. The right-side frame member 84B is tilted from a fixation part to the front-side frame member 81 toward the front side in a plan view such that the right-side frame member 84B is positioned farther on the right side at a position farther on the front side. A front portion of the right-side frame member 84B is connected to the part of the dash panel 50 higher than and away from the occupant-space-side floor panel 41.

As illustrated in FIG. 3, the upper-portion structural body 3 includes first to third connection members 101 to 103. The first to third connection members 101 to 103 are members for connecting the center frame 80 to the occupant-space-side floor panel 41, each member extending upward from the occupant-space-side floor panel 41 and having an upper portion fixed to the center frame 80. The first connection member 101 is disposed farthest on the front side in the occupant space R1, and the first connection member 101 is separated on the rear side from the dash panel 50. A lower portion of the first connection member 101 is fixed to a site separated on the rear side from the dash panel 50 on the occupant-space-side floor panel 41, and an upper portion of the first connection member 101 is fixed to a site separated on the rear side from the dash panel 50 on the center frame 80. The second connection member 102 is separately disposed on the rear side of the first connection member 101. A lower portion of the second connection member 102 is connected to the intermediate cross member 44B. The third connection member 103 is separately disposed on the rear side of the second connection member 102. A lower portion of the third connection member 103 is connected to the recessed-portion front-side cross member 44C.

As illustrated in FIG. 5, the first connection member 101 includes a left-side member (left-side connection member) 101A and a right-side member (right-side connection member) 101B. Lower portions of the left-side member 101A and the right-side member 101B are fixed to the front-portion cross member 44A. The left-side member 101A extends at a tilt in a front view such that the left-side member 101A is positioned farther on the left side at a position farther on the upper side from the front-portion cross member 44A. An upper portion of the left-side member 101A is fixed to the front portion of the left-side frame member 84A of the center frame 80. The right-side member 101B extends at a tilt in a front view such that the right-side member 101B is positioned farther on the right side at a position farther on the upper side from the front-portion cross member 44A. An upper portion of the right-side member 101*b* is fixed to the front portion of the right-side frame member 84B of the center frame 80. Since the front portion of the left-side frame member 84A and the front portion of the right-side frame member 84B are separated from each other in the right-left direction, most parts of the left-side member 101A and the right-side member 101B except for the lower portions thereof are separated from each other in the right-left direction, and accordingly, the interval between the left-side member 101A and the right-side member 101B in the right-left direction is larger at a position farther on the upper side.

As illustrated in FIG. 4, the upper-portion structural body 3 includes an air-conditioning device 120 that generates air-conditioned air to be sent to the occupant space R1. The air-conditioning device 120 is disposed on the front side of a front portion of the front-side frame member 81 and positioned on the front side of the center frame 80.

The air-conditioning device 120 includes a cooler (heat exchanger) 121 through which air-conditioned air passes, an air conditioning casing 122 in which the cooler 121 is housed, and an air distribution portion 123. The cooler 121 is a cooling heat exchanger including, for example, an evaporator for cooling air-conditioned air, but is not limited thereto and may be a heating heat exchanger that includes a heater core, a condenser, and the like and heats air-conditioned air. The cooler 121 of the present embodiment is disposed on the front side of the dash panel 50.

In addition to the above-described cooler 121, a non-illustrated heater, and an air mix damper 122*a* for generating air-conditioned air at a desired temperature by changing the mixed ratio of cool air having passed through the cooler 121 and warm air having passed through the heater are housed inside the air conditioning casing 122 of the air-conditioning device 120. Part of the air conditioning casing 122 in which the cooler 121 and the air mix damper 122*a* are housed is arranged on the front side of the dash panel 50.

Figure 11:
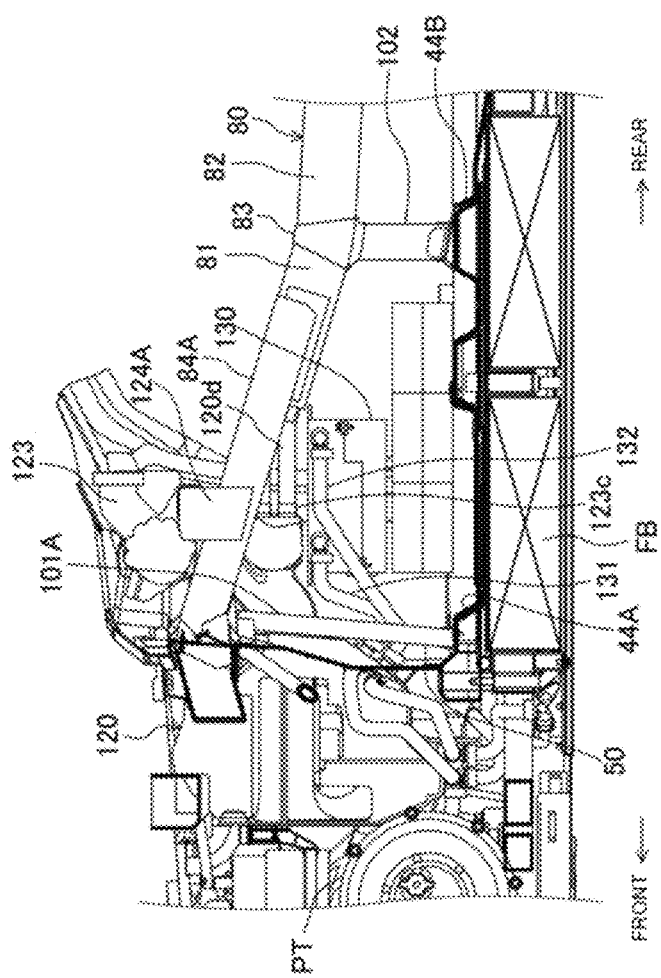
FIG. 11 is a cross-sectional diagram of an air-conditioning device and the vicinity thereof according to an embodiment of the present disclosure.
Figure 12:
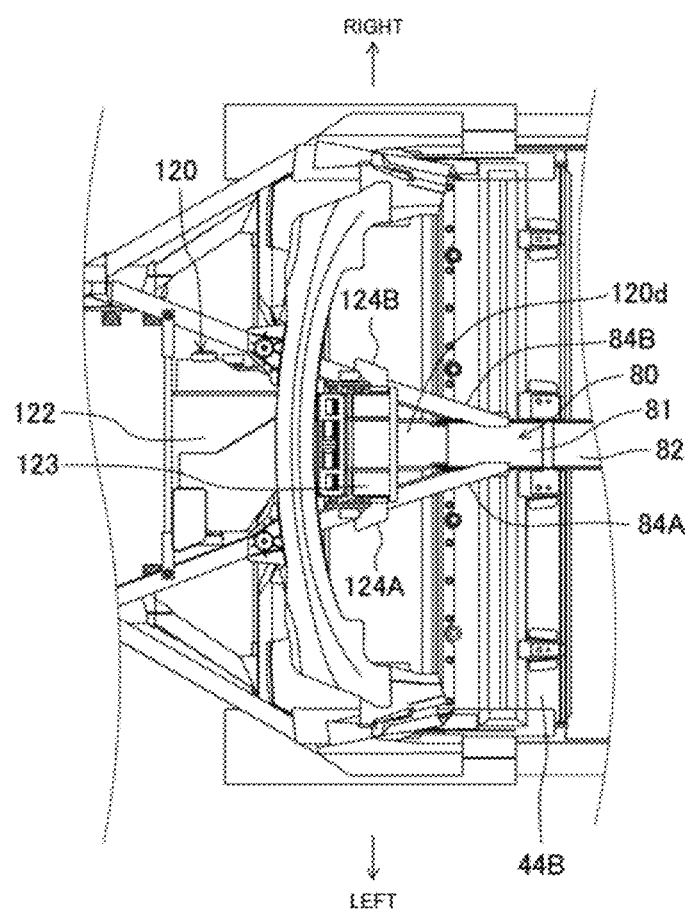
FIG. 12 is a plan view of the air-conditioning device and the vicinity thereof according to an embodiment of the present disclosure.

As illustrated in FIG. 11 as well, the air distribution portion 123 is a part that distributes air-conditioned air generated in the air conditioning casing 122 to each portion of the occupant space R1 and is provided on the upper side and the rear side of the air conditioning casing 122. Specifically, the air distribution portion 123 is positioned higher than the front portion of the center frame 80 and the rear side of the dash panel 50, in other words, at a vehicle-width-direction central portion in the occupant space R1.

As illustrated in FIG. 4, a plurality of vent direction switching dampers 123*b* are provided inside the air distribution portion 123. Through operation of the vent direction switching dampers 123*b*, the air-conditioned air can be supplied to the inner surface of a front window glass FG (illustrated in FIG. 1), supplied to the upper body of a passenger, and supplied to the vicinity of the feet of a passenger. The operation of the vent direction switching damper 123*b* has been conventionally well known. In addition, the vent direction switching dampers 123*b* for the rear row are provided inside the air distribution portion 123.

The air distribution portion 123 includes a vent portion 123*c* having a duct shape through which air-conditioned air generated inside the air conditioning casing 122 is vented out. The air-conditioning device 120 also includes an air introducing duct 120*d* that provides communication between the inside of the air distribution portion 123 and the inside of the center frame 80 and introduces, into the inside of the center frame 80, air-conditioned air vented out of the vent portion 123*c* of the air distribution portion 123. The air introducing duct 120*d* is arranged between the left-side frame member 84A and the right-side frame member 84B above a control device 130 to be described later and extends in the front-rear direction. A front portion of the air introducing duct 120*d* is connected to the vent portion 123*c*, and a rear portion of the air introducing duct 120*d* is connected to the front portion of the front-side frame member 81 of the center frame 80. Accordingly, the air-conditioned air generated by the air-conditioning device 120 is introduced to the inside of the center frame 80 through the air introducing duct 120*d*. The air introducing duct 120*d* may be a member that constitutes part of the center frame 80.

Since the center frame 80 extends in the front-rear direction, the air-conditioned air can be guided to a desired place in the front-rear direction in the occupant space R1. In this case, since the air introducing duct 120*d* is disposed at a higher position than the control device 130 and has a predetermined width in the right-left direction, direct sunlight is interrupted by the air introducing duct 120*d* as well and further unlikely to reach the control device 130. Moreover, since the center frame 80 is used as an air conditioning duct, an air conditioning duct does not need to be redundantly provided and the occupant space R1 can be enlarged as compared to a case in which an air conditioning duct is redundantly provided.

As illustrated in FIG. 3, upper-side air-sending portions 80*b* for sending the air-conditioned air in the upper-left path T11 and the upper-right path T12 upward is provided at parts separated on the rear side from the air introducing duct 120*d* at an upper wall portion of the center frame 80. The upper-side air-sending portions 80*b* are positioned on the rear side of backrest portions of the front seats FS at the upper wall portion of the center frame 80 and provided on the right and left sides, respectively. The left-side upper-side air-sending portion (left-side air-sending portion) 80*b* has a tubular shape that communicates with the inside of the upper-left path T11, and the right-side upper-side air-sending portion (right-side air-sending portion) 80*b* has a tubular shape that communicates with the inside of the upper-right path T12. Downstream ends of the upper-side air-sending portions 80*b* are opened upward to face passengers sitting on the rear seats RS.

Lower-side air-sending portions 80*c* for sending the air-conditioned air in the lower-left path T13 and the lower-right path T14 downward are provided at parts separated on the rear side from the air introducing duct 120*d* at a lower wall portion of the center frame 80. The lower-side air-sending portions 80*c* are positioned on the rear side of seat cushion portions of the front seats FS and provided on the right and left sides, respectively, of the lower wall portion of the center frame 80. The left-side lower-side air-sending portion 80*c* has a tubular shape that communicates with the inside of the lower-left path T13, and the right-side lower-side air-sending portion 80*c* has a tubular shape that communicates with the inside of the lower-right path T14. Each lower-side air-sending portion 80*c* is constituted by a rear heat duct extending downward toward the recessed portion 41*a*, and extending downward from the center frame 80 and then bending toward a vehicle-width-direction outer side. One of the upper-side air-sending portion 80*b* and the lower-side air-sending portion 80*c* may be omitted.

Since the center frame 80 has a cross-section that is large enough to improve the distortion stiffness of the vehicle body, air sending noise can be maintained low when the amount of the air-conditioned air circulating inside the center frame 80 is increased. In particular, since the center frame 80 extends in a substantially straight shape, a path inside the center frame 80 has a substantially straight shape as well, and air sending noise can be maintained low for this reason as well. When the center frame 80 includes no heat insulation material nor the like, heat of the air-conditioned air circulating inside the center frame 80 is transferred to a wall portion of the center frame 80 and radiated from the outer surface of the wall portion to the occupant space R1. Accordingly, it is possible to perform desirable air conditioning by using radiation heat. Note that the center frame 80 may include a heat insulation material.

The air-conditioning device 120 includes under-feet ducts 124A and 124B that guide, to the lower side, air-conditioned air sent from the air distribution portion 123. The under-feet ducts 124A and 124B include a left-side front under-feet duct 124A and a right-side front under-feet duct 124B for mainly supplying warm air to the vicinity of the feet of passengers sitting on the front seats FS. An upstream end (upper end) of the left-side front under-feet duct 124A is arranged at a higher position than the left-side frame member 84A, is attached to a left side wall of the air distribution portion 123, and communicates with the inside of the air distribution portion 123. The left-side front under-feet duct 124A extends leftward from its upstream end on the upper side of the left-side frame member 84A of the center frame 80 and then extends downward along a left-side surface of the left-side frame member 84A. A downstream end of the left-side front under-feet duct 124A is opened downward. In other words, the left-side front under-feet duct 124A extends downward from the upper side of the left-side frame member 84A through the vehicle-wide-direction outer side of the left-side frame member 84A.

An upstream end (upper end) of the right-side front under-feet duct 124B is arranged at a higher position than the right-side frame member 84B, attached to a right side wall of the air distribution portion 123, and communicates with the inside of the air distribution portion 123. The right-side front under-feet duct 124B extends rightward from its upstream end on the upper side of the right-side frame member 84B of the center frame 80 and then extends downward along a right-side surface of the right-side frame member 84B. A downstream end of the right-side front under-feet duct 124B is opened downward. In other words, the right-side front under-feet duct 124B extends downward from the upper side of the right-side frame member 84B through the vehicle-width-direction outer side of the right-side frame member 84B.

Since the air distribution portion 123 is arranged at a higher position than the left-side frame member 84A and the right-side frame member 84B and the left-side front under-feet duct 124A and the right-side front under-feet duct 124B are disposed extending from the upper side of the left-side frame member 84A and the right-side frame member 84B to the sides thereof, a space can be provided on the lower side of the center frame 80. The space below the center frame 80 can be effectively utilized by arranging objects and the like in the space. In the present embodiment, as illustrated in FIGS. 4 and 11, the control device 130 is disposed on the lower side of the front side of the center frame 80.

The left-side front under-feet duct 124A and the right-side front under-feet duct 124B are disposed at an interval in the right-left direction. The air introducing duct 120*d* extending in the front-rear direction is disposed between the left-side front under-feet duct 124A and the right-side front under-feet duct 124B, and accordingly, a space between the left-side front under-feet duct 124A and the right-side front under-feet duct 124B can be effectively used.

The dimensions of sections of the left-side front under-feet duct 124A and the right-side front under-feet duct 124B, the sections being orthogonal to an air circulation direction, in the front-rear direction are set to be longer than the dimensions of the sections in the vehicle width direction. Accordingly, since the sections of the under-feet ducts 124A and 124B have flat shapes that are long in the front-rear direction, the cross-sectional area can be enlarged to have a large air-sending volume while expansion of the under-feet ducts 124A and 124B in the vehicle width direction is suppressed. Note that the under-feet ducts 124A and 124B may extend to the vicinity of the occupant-space-side floor panel 41. One of the under-feet ducts 124A and 124B may be omitted.

(Layout of Control Device)

The vehicle-body structure A includes the control device 130 (illustrated in FIGS. 4 and 11) that controls control target units mounted on the automobile 1. Examples of the control target units include the powertrains PT, a brake device, an electric control suspension device, a lighting device, a navigation device, a head-up display device, an audio device, an in-vehicle monitor, and a television. The control device 130 that controls these control target units includes a high-performance CPU, a memory, and the like, and thus has an increased size and is weak against high heat and also weak against impact. For example, a water jacket through which cooling water circulates is provided as a heat generation measure in the control device 130. An in-vehicle entertainment function (moving image playback function or music playback function) or the like is mounted in some cases, and in such a case as well, the size of the control device 130 increases.

The control device 130 of the present embodiment is arranged at a lower position than the front portion of the center frame 80 in the occupant space R1. As illustrated with a virtual line in FIG. 4, an instrument panel IP to which meters and gauges are attached is arranged at a higher position than the front portion of the center frame 80. The instrument panel IP extends in the right-left direction from the left side of the occupant space R1 to the right side thereof. A front portion of the instrument panel IP reaches a lower portion of the front window glass FG (illustrated in FIG. 1).

Since the control device 130 is arranged at a lower position than the center frame 80 in the occupant space R1, for example, direct sunlight from the outside is interrupted by the center frame 80 and unlikely to reach the control device 130. Thus, the control device 130 can be arranged at a thermally advantageous place. Moreover, since the instrument panel IP is arranged at a higher position than the control device 130, direct sunlight is interrupted by the instrument panel IP as well and further unlikely to reach the control device 130. Since the control device 130 is covered by the instrument panel IP, the control device 130 is unlikely to be viewed from the outside, which is preferable in terms of security.

The air introducing duct 120d is disposed at a higher position than the control device 130. Heat of the air-conditioned air is transferred to a wall portion of the air introducing duct 120d and radiated as radiation heat from the outer surface of the wall portion toward the control device 130. In this case, since the air-conditioned air having a temperature adjusted so that the occupant space R1 becomes comfortable flows inside the air introducing duct 120d, the radiation heat from the air introducing duct 120d acts on to suppress temperature increase of the control device 130. Moreover, direct sunlight can be interrupted by the air introducing duct 120d.

(Cooling Path)

Figure 13:
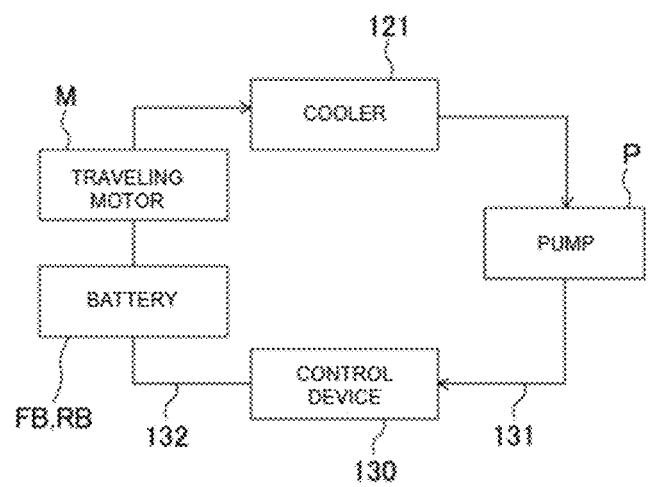
FIG. 13 is a schematic diagram of a cooling path according to an embodiment of the present disclosure.

Subsequently, a cooling path will be described below. FIG. 13 is a diagram illustrating a schematic structure of a cooling path provided in the automobile 1. The cooler 121 is configured as a cooling heat exchanger of the air-conditioning device 120. A path of cooling water as a heat exchange medium is formed in the cooler 121, and the cooling water circulating through the path is cooled through heat exchange with a low-temperature coolant inside the cooler 121. The vehicle-body structure A includes a supply pipe 131 for supplying the cooling water cooled by the cooler 121 to the water jacket included in the control device 130, and a discharge pipe 132 for discharging the cooling water supplied to the control device 130. The supply pipe 131 is provided with a pump P for transferring the cooling water to the control device 130. The cooling water discharged from the discharge pipe 132 is cooled through the cooler 121 and then taken into the pump P. The control device 130 is cooled as the cooling water is circulated in this manner. Note that a coolant may be used in place of the cooling water.

As illustrated in FIG. 4, the cooler 121 is disposed on the rear side of the front-side powertrain PT and positioned close to the dash panel 50. Accordingly, the cooler 121 is positioned closer to the control device 130 than the front-side powertrain PT. Thus, the length of the supply pipe 131 can be short and a pipe path is simple, which leads to reduction of a pressure loss when the cooling water is supplied to the control device 130 and also leads to reduction of a cold loss between the cooler 121 and the control device 130, and accordingly, the control device 130 can be efficiently cooled.

Working Effects of Embodiment

As described above, according to the present embodiment, a vehicle-body reinforcement effect is obtained since the center frame 80 higher than and away from the occupant-space-side floor panel 41 is provided in the occupant space R1, and as a result, vehicle body stiffness can be increased. Moreover, since the air distribution portion 123 of the air-conditioning device 120 is positioned higher than the center frame 80, the air distribution portion 123 does not need to be arranged in the space below the center frame 80. In addition, since the under-feet ducts 124A and 124B connected to the air distribution portion 123 each extend downward through the vehicle-width-direction outer side of the center frame 80, the under-feet ducts 124A and 124B do not need to be arranged in the space below the center frame 80. Thus, various components, devices, and the like can be arranged in the space below the center frame 80, which improves flexibility of layout.

Since the left-side under-feet duct 124A and the right-side under-feet duct 124B are provided on the right and left sides, respectively, of the air distribution portion 123, air-conditioned air can be sent to the left and right sides in the occupant space R1 through the left-side under-feet duct 124A and the right-side under-feet duct 124B, respectively, and accordingly, passenger comfort can be improved.

Air-conditioned air generated by the air-conditioning device 120 is introduced into the center frame 80 through the air introducing duct 120d and then vented out of the air-sending portions 80b and 80c. Since the center frame 80 extends in the front-rear direction, air-conditioned air can be guided to a desired place in the front-rear direction in the occupant space R1. In this case, since the air introducing duct 120d is disposed between the left-side frame member 84A and the right-side frame member 84B, the air introducing duct 120d does not need to be arranged in the space below the center frame 80, and thus flexibility of layout in the space below the center frame 80 does not degrade.

The above-described embodiment is merely exemplary in any aspects and not to be interpreted in a restrictive manner. Furthermore, modifications and changes belonging to a scope equivalent to the claims are all included in the scope of the present disclosure.

INDUSTRIAL APPLICABILITY

As described above, a vehicle-body structure according to the present disclosure is applicable to, for example, an electric vehicle and other automobiles.

The present disclosure is not limited to only the above-described embodiments, which are merely exemplary. It will be appreciated by those skilled in the art that the disclosed systems and/or methods can be embodied in other specific forms without departing from the spirit of the disclosure or essential characteristics thereof. The presently disclosed embodiments are therefore considered to be illustrative and not restrictive. The disclosure is not exhaustive and should not be interpreted as limiting the claimed disclosure to the specific disclosed embodiments. In view of the present disclosure, one of skill in the art will understand that modifications and variations are possible in light of the above teachings or may be acquired from practicing of the disclosure.

Reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The scope of the disclosure is indicated by the appended claims, rather than the foregoing description.

REFERENCE SIGNS LIST 1 automobile
41 occupant-space-side floor panel
80 center frame
80b upper-side air-sending portion
80c lower-side air-sending portion
84A left-side frame member
84B right-side frame member
120 air-conditioning device
120d air introducing duct
123 air distribution portion
124A left-side front under-feet duct (left-side under-feet duct)
124B right-side front under-feet duct (right-side under-feet duct)
130 control device
A vehicle-body structure

The invention claimed is:

1. A vehicle-body structure of an automobile, the vehicle-body structure comprising:
a floor panel constituting a floor of an occupant space including a seat on which a passenger sits;
a center frame disposed to be higher than and away from the floor panel at a vehicle-width-direction central portion of the occupant space and extending from a front side of an occupant space to a rear side of the occupant space in a vehicle front-rear direction; and
an air-conditioner for sending air-conditioned air to the occupant space, wherein
the air-conditioner includes an air distribution structure that is positioned higher than a front portion of the center frame and distributes generated air-conditioned air to each portion of the occupant space, and an under-feet duct that guides, to a lower side, air-conditioned air sent from the air distribution structure,
the under-feet duct extends downward from an upper side of the center frame through a vehicle-width-direction outer side of the center frame,
the front portion of the center frame is constituted by a left-side frame structure and a right-side frame structure that are provided at an interval in a vehicle width direction,
the under-feet duct includes a left-side under-feet duct extending downward from an upper side of the left-side frame structure through a vehicle-width-direction outer side of the left-side frame structure, and a right-side under-feet duct extending downward from an upper side of the right-side frame structure through a vehicle-width-direction outer side of the right-side frame structure,
wherein the center frame includes a front-side frame structure extending in the front-rear direction, a rear-side frame structure disposed on the vehicle rear side of the front-side frame structure and extending toward the rear side, and a connection structure connecting a rear portion of the front-side frame structure and a front portion of the rear-side frame structure, and
wherein the front-side frame structure is tilted at a first tilt angle relative to a horizontal plane and extends straight, and the rear-side frame structure is tilted at a second tilt angle smaller than the first tilt angle relative to the horizontal plane and extends straight.

2. The vehicle-body structure according to claim 1, wherein
the center frame has a hollow shape,
an air introducing duct that provides communication between the air distribution structure of the air-conditioner and inside of the center frame and introduces, into the inside of the center frame, air-conditioned air vented out of the air distribution structure, wherein the air introducing duct is disposed between the left-side frame structure and the right-side frame structure, and
an air-sending structure for sending air-conditioned air in the center frame, wherein the air-sending structure is provided at a part separated on a vehicle rear side from a connection structure of the center frame to the air introducing duct.

3. The vehicle-body structure according to claim 2, wherein a controller that controls a control target structure mounted on the automobile is disposed at a lower position than the center frame.

4. The vehicle-body structure according to claim 3, wherein a first dimension of a section of the under-feet duct in the vehicle front-rear direction is longer than a second dimension of the section of the under-feet duct in a vehicle width direction, the section being orthogonal to an air circulation direction.

5. The vehicle-body structure according to claim 1, wherein a controller that controls a control target structure mounted on the automobile is disposed at a lower position than the center frame.

6. The vehicle-body structure according to claim 1, wherein a first dimension of a section of the under-feet duct in the vehicle front-rear direction is longer than a second dimension of the section of the under-feet duct in a vehicle width direction, the section being orthogonal to an air circulation direction.

7. The vehicle-body structure according to claim 1, wherein a controller that controls a control target structure mounted on the automobile is disposed at a lower position than the center frame.

8. The vehicle-body structure according to claim 1, wherein a first dimension of a section of the under-feet duct in the vehicle front-rear direction is longer than a second dimension of the section of the under-feet duct in a vehicle width direction, the section being orthogonal to an air circulation direction.

9. The vehicle-body structure according to claim 2, wherein a first dimension of a section of the under-feet duct in the vehicle front-rear direction is longer than a second dimension of the section of the under-feet duct in a vehicle width direction, the section being orthogonal to an air circulation direction.

10. The vehicle-body structure according to claim 1, wherein the air distribution structure is disposed on an upper side and a rear side of the air conditioner.

11. The vehicle-body structure according to claim 1, wherein the air distribution structure is positioned higher than a rear side of the dash panel at the vehicle-width-direction central portion of the occupant space.

12. The vehicle-body structure according to claim 1, wherein the left-side front under-feet duct extends leftward from its upstream end on the upper side of the left-side frame structure and then extends downward along a left-side surface of the left-side frame structure; and
   the right-side front under-feet duct extends rightward from its upstream end on the upper side of the right-side frame structure and then extends downward along a right-side surface of the right-side frame structure.

13. The vehicle-body structure according to claim 1, wherein the front-side frame structure is positioned higher than the rear-side frame structure relative to the floor panel.

14. The vehicle-body structure according to claim 2, wherein the air introducing duct is a structure that constitutes part of the center frame.

15. The vehicle-body structure according to claim 3, wherein the air-conditioner is closer to the controller than a powertrain mounted on the automobile.

16. The automobile comprising the vehicle-body structure according to claim 1.

17. The automobile according to claim 16, wherein the automobile is an electric vehicle.

* * * * *